United States Patent
N et al.

(10) Patent No.: US 11,833,886 B2
(45) Date of Patent: Dec. 5, 2023

(54) SYSTEMS AND METHODS OF DISTRIBUTING COLD CHAIN DIAGNOSTICS TO OWN AND THIRD PARTY COLD CHAIN, TRUCKING AND REFRIGERATION SOLUTION PROVIDERS

(71) Applicant: Carrier Corporation, Palm Beach Gardens, FL (US)

(72) Inventors: Ananthakrishnan N, Telangana (IN); Lewis Gordon Curtis, Georgetown, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 440 days.

(21) Appl. No.: 17/254,727

(22) PCT Filed: Sep. 10, 2019

(86) PCT No.: PCT/US2019/050346
§ 371 (c)(1),
(2) Date: Dec. 21, 2020

(87) PCT Pub. No.: WO2020/060800
PCT Pub. Date: Mar. 26, 2020

(65) Prior Publication Data
US 2021/0245578 A1 Aug. 12, 2021

(30) Foreign Application Priority Data
Sep. 17, 2018 (IN) .............................. 201811034900

(51) Int. Cl.
*B60H 1/00* (2006.01)
*B60P 3/20* (2006.01)
(Continued)

(52) U.S. Cl.
CPC ....... *B60H 1/00978* (2013.01); *B60H 1/0073* (2019.05); *B60P 3/20* (2013.01);
(Continued)

(58) Field of Classification Search
CPC ............. B60H 1/00978; B60H 1/0073; G07C 5/0808; B60P 3/20; G06Q 50/28; G06Q 10/0832
See application file for complete search history.

(56) References Cited

U.S. PATENT DOCUMENTS 6,892,546 B2 5/2005 Singh et al.
9,218,585 B2 12/2015 Gupta
(Continued)

FOREIGN PATENT DOCUMENTS

CN 202101699 U 1/2012
CN 202815546 U 3/2013
(Continued)

OTHER PUBLICATIONS

International Search Report dated Oct. 31, 2019; International Application No. PCT/US2019/050346; International Filing Date Sep. 10, 2019 (5 pgs).
(Continued)

*Primary Examiner* — Lionel Nouketcha
(74) *Attorney, Agent, or Firm* — CANTOR COLBURN LLP

(57) ABSTRACT

A system for analyzing a transport refrigeration system including: a storage device to store transport parameters associated with a transport refrigeration system and customer licenses; a diagnostics engine in electronic communication with the storage device, the diagnostics engine including: a license module to determine whether a user device has a customer license for at least one of descriptive data, diagnostic data, predictive data, and prescriptive data; a descriptive module to determine descriptive data in
(Continued)

Figure 1:
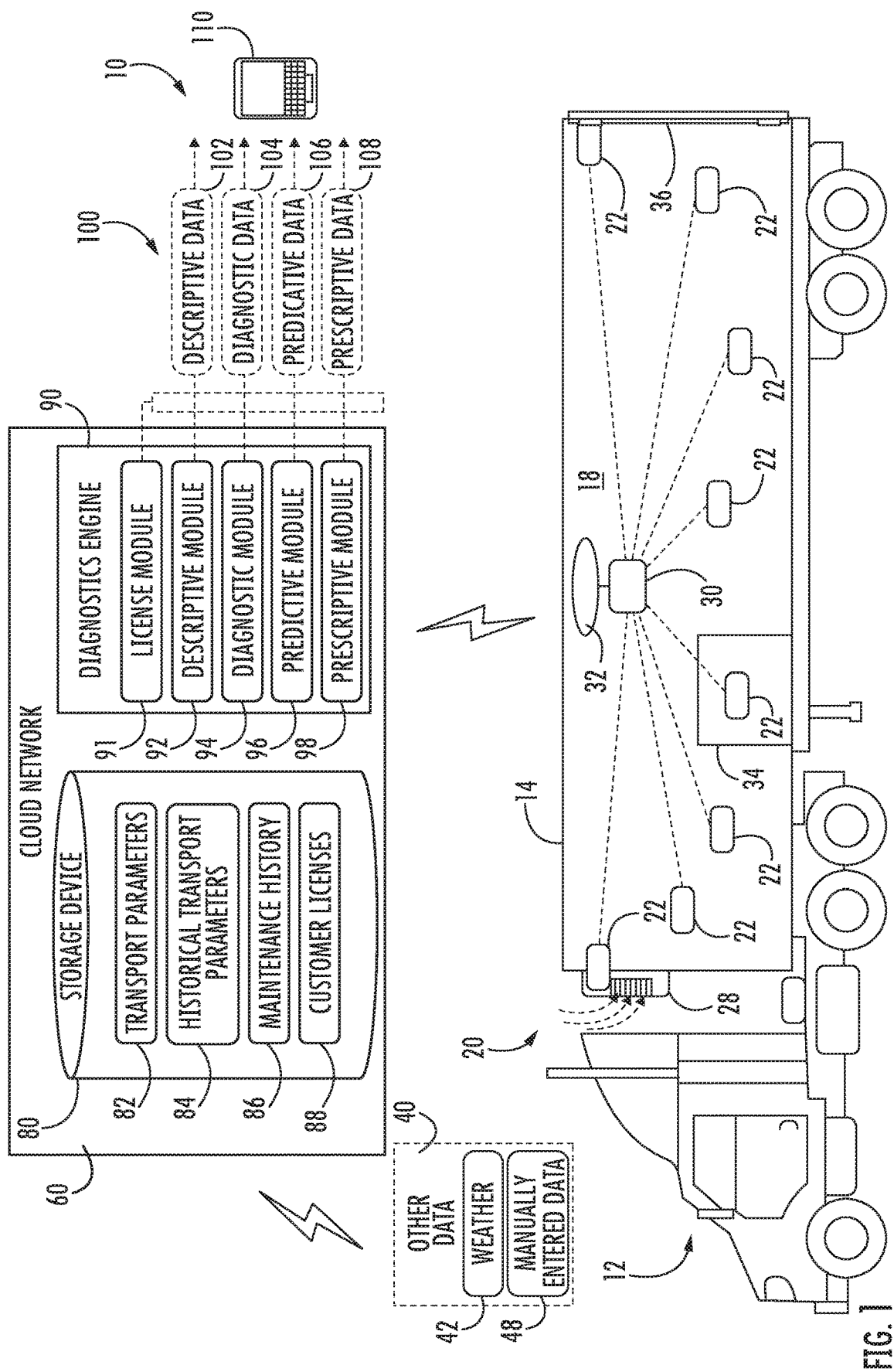

response to at least the transport parameters; a diagnostic module to determine diagnostic data of the transport refrigeration unit in response to at least the transport parameters; a predictive module to determine predictive data; and a prescriptive module to determine prescriptive data.

20 Claims, 2 Drawing Sheets

(51) Int. Cl.
  *G06Q 10/20* (2023.01)
  *G06Q 50/30* (2012.01)
  *G07C 5/08* (2006.01)
(52) U.S. Cl.
  CPC ............ *G06Q 10/20* (2013.01); *G06Q 50/30* (2013.01); *G07C 5/0808* (2013.01)

(56) References Cited

U.S. PATENT DOCUMENTS

| | | | |
|---|---|---|---|
| 9,438,648 | B2 | 9/2016 | Asenjo et al. |
| 9,451,031 | B2 | 9/2016 | Graziano et al. |
| 2014/0180953 | A1 | 6/2014 | Westcott et al. |
| 2016/0138856 | A1 | 5/2016 | Wilson |
| 2018/0099712 | A1 | 4/2018 | Bean et al. |

FOREIGN PATENT DOCUMENTS

| | | | | |
|---|---|---|---|---|
| CN | 203386238 | U | 1/2014 | |
| CN | 103973757 | A | 8/2014 | |
| CN | 104407593 | A | 3/2015 | |
| CN | 104568180 | A | 4/2015 | |
| CN | 204613725 | U | 9/2015 | |
| CN | 105629957 | A | 6/2016 | |
| CN | 105698863 | A | 6/2016 | |
| CN | 205787819 | U | 12/2016 | |
| CN | 106502184 | A | 3/2017 | |
| CN | 107491128 | A | 12/2017 | |
| WO | 2017155775 | A1 | 9/2017 | |
| WO | 2017172443 | A1 | 10/2017 | |
| WO | 2017172484 | A1 | 10/2017 | |
| WO | 2017172701 | A1 | 10/2017 | |
| WO | WO-2017172443 | A1 * | 10/2017 | ............ G06Q 10/08 |

OTHER PUBLICATIONS

Written Opinion dated Oct. 31, 2019; International Application No. PCT/US2019/050346; International Filing Date Sep. 10, 2019 (8 pgs).

Fronetics, "Internet of Things and itsImpact on Supply Chain Management", https://www.fronetics.com/internet-of-things-and-its-impact-on-supply-chain-management/, Jun. 26, 2014, 7 pages.

Mukundan, Ranjirth, et al., "Cold Chain Remote Monitoring System in Dairy Industry—Need of the Hour", http://www.stellapps.com/wp-content/uploads/2016/08/White-Paper-for-Cold-Chain-Remote-Monitoring.pdf, Jul. 15, 2016, 15 pages.

http://www.stellapps.com/wp-content/uploads/2016/08/White-Paper-for-Cold-Chain-Remote-Monitoring.pdf; Jul. 15, 2016; 15 pages.

https://www.fronetics.com/internet-of-things-and-its-impact-on-supply-chain-management/; Jun. 26, 2014; 7 pages.

* cited by examiner

SYSTEMS AND METHODS OF DISTRIBUTING COLD CHAIN DIAGNOSTICS TO OWN AND THIRD PARTY COLD CHAIN, TRUCKING AND REFRIGERATION SOLUTION PROVIDERS

BACKGROUND

The subject matter disclosed herein generally relates to cold chain distribution systems, and more specifically to an apparatus and a method for analyzing cold chain distribution system.

Typically, cold chain distribution systems are used to transport and distribute perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

In conventional systems, maintenance for transport refrigeration systems is conducted utilizing planned maintenance activities performed at selected intervals for all transportation refrigeration systems.

BRIEF SUMMARY

According to one embodiment, a system for analyzing a transport refrigeration system is provided. The system including: a storage device to store transport parameters associated with a transport refrigeration system and customer licenses; a diagnostics engine in electronic communication with the storage device, the diagnostics engine including: a license module to determine whether a user device has a customer license for at least one of descriptive data, diagnostic data, predictive data, and prescriptive data; a descriptive module to determine descriptive data in response to at least the transport parameters and transmit the descriptive data to the user device if the user device has a customer license for descriptive data; a diagnostic module to determine diagnostic data of the transport refrigeration unit in response to at least the transport parameters and transmit the diagnostic data to the user device if the user device has a customer license for diagnostic data; a predictive module to determine predictive data in response to at least the transport parameters and transmit the predictive data to the user device if the user device has a customer license for predictive data; and a prescriptive module to determine prescriptive data in response to at least the transport parameters and transmit the prescriptive data to the user device if the user device has a customer license for prescriptive data.

In addition to one or more of the features described above, or as an alternative, further embodiments may include that the storage device stores historical transport parameters for the transport refrigeration system.

In addition to one or more of the features described above, or as an alternative, further embodiments may include that the storage device stores a maintenance history of the transportation refrigeration system.

In addition to one or more of the features described above, or as an alternative, further embodiments may include that the descriptive module determines descriptive data in response to the transport parameters and historical transport parameters.

In addition to one or more of the features described above, or as an alternative, further embodiments may include that the diagnostic module determines diagnostic data in response to the transport parameters and historical transport parameters.

In addition to one or more of the features described above, or as an alternative, further embodiments may include that the predictive module determines predictive data in response to the transport parameters and historical transport parameters.

In addition to one or more of the features described above, or as an alternative, further embodiments may include that the prescriptive module determines prescriptive data in response to the transport parameters and historical transport parameters.

In addition to one or more of the features described above, or as an alternative, further embodiments may include that the descriptive module determines descriptive data in response to the transport parameters and the maintenance history.

In addition to one or more of the features described above, or as an alternative, further embodiments may include that the diagnostic module determines diagnostic data in response to the transport parameters and the maintenance history.

In addition to one or more of the features described above, or as an alternative, further embodiments may include that the predictive module determines predictive data in response to the transport parameters and the maintenance history.

In addition to one or more of the features described above, or as an alternative, further embodiments may include that the prescriptive module determines prescriptive data in response to the transport parameters and the maintenance history.

According to another embodiment, a method for analyzing a transport refrigeration system is provided. The method including: storing transport parameters associated with a transport refrigeration system and customer licenses; determining whether a user device has a customer license for at least one of descriptive data, diagnostic data, predictive data, and prescriptive data; determining at least one of descriptive data, diagnostic data, predictive data, and prescriptive data in response to at least the transport parameters; transmitting the descriptive data to the user device if the user device has a customer license for descriptive data; transmitting the diagnostic data to the user device if the user device has a customer license for diagnostic data; transmitting the predictive data to the user device if the user device has a customer license for predictive data; and transmitting the prescriptive data to the user device if the user device has a customer license for prescriptive data.

In addition to one or more of the features described above, or as an alternative, further embodiments may include: storing historical transport parameters for the transport refrigeration system.

In addition to one or more of the features described above, or as an alternative, further embodiments may include: storing a maintenance history of the transportation refrigeration system.

In addition to one or more of the features described above, or as an alternative, further embodiments may include that the descriptive data is determined in response to the transport parameters and historical transport parameters.

In addition to one or more of the features described above, or as an alternative, further embodiments may include that the diagnostic data is determined in response to the transport parameters and historical transport parameters.

In addition to one or more of the features described above, or as an alternative, further embodiments may include that the predictive data is determined in response to the transport parameters and historical transport parameters.

In addition to one or more of the features described above, or as an alternative, further embodiments may include that the prescriptive data is determined in response to the transport parameters and historical transport parameters.

In addition to one or more of the features described above, or as an alternative, further embodiments may include that the descriptive data is determined in response to the transport parameters and the maintenance history.

In addition to one or more of the features described above, or as an alternative, further embodiments may include that the diagnostic data is determined in response to the transport parameters and the maintenance history.

Technical effects of embodiments of the present disclosure include delivering different levels of data for analysis of a transportation refrigeration system in response to a license of a user The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
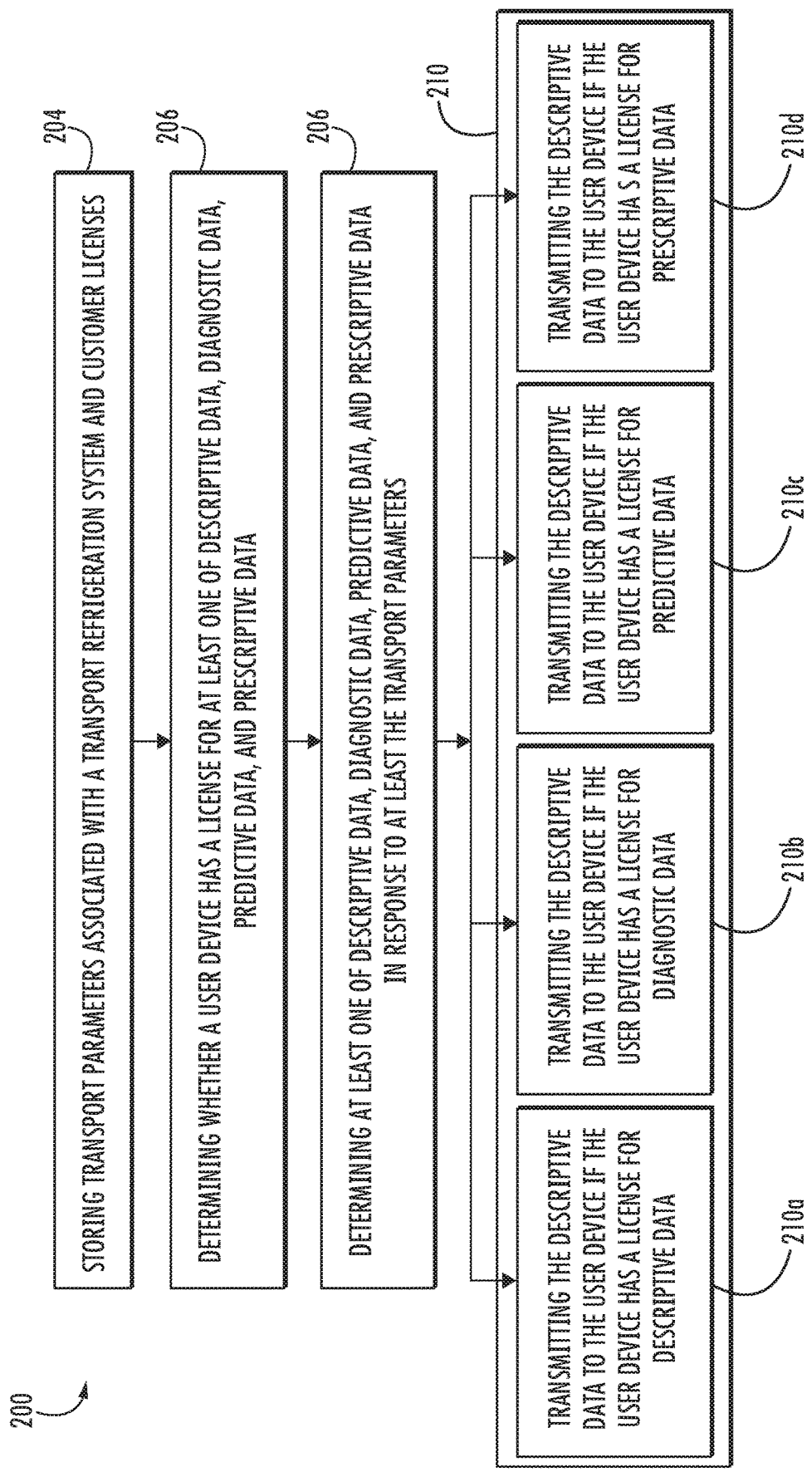

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

The following descriptions should not be considered limiting in any way. With reference to the accompanying drawings, like elements are numbered alike:

FIG. 1 illustrates a schematic view of a system for analyzing refrigeration system, according to an embodiment of the present disclosure; and FIG. 2 is a flow diagram illustrating a method for analyzing a refrigeration system, according to an embodiment of the present disclosure.

DETAILED DESCRIPTION

A detailed description of one or more embodiments of the disclosed apparatus and method are presented herein by way of exemplification and not limitation with reference to the Figures.

Referring now to the drawings, FIG. 1 illustrates a schematic view of a system 10 for providing analytics for refrigeration transportation systems. Typically, transport refrigeration systems 20 are used to transport and distribute perishable goods and environmentally sensitive goods (herein referred to as perishable goods 34). In the illustrated embodiment, a transport refrigeration system 20 includes an environmentally controlled container 14, a transport refrigeration unit 28 and perishable goods 34. The container 14 may be pulled by a vehicle 12. It is understood that embodiments described herein may be applied to shipping containers that are shipped by rail, sea, air, or any other suitable container, thus the vehicle may be a truck, train, boat, airplane, helicopter . . . etc. The container 14 may define an interior compartment 18.

In the illustrated embodiment, the transport refrigeration unit 28 is associated with a container 14 to provide desired environmental parameters, such as, for example temperature, pressure, humidity, carbon dioxide, ethylene, ozone, light exposure, vibration exposure, and other conditions to the interior compartment 18. In further embodiments, the transport refrigeration unit 28 is a refrigeration system capable of providing a desired temperature and humidity range. The transportation refrigeration unit (TRU) 28 may be powered by an energy source such as, for example, gasoline, diesel, electricity, or another known energy source to a person skilled in the art. The perishable goods 34 may include but are not limited to fruits, vegetables, grains, beans, nuts, eggs, dairy, seed, flowers, meat, poultry, fish, ice, blood, pharmaceuticals, or any other suitable cargo requiring cold chain transport.

In the illustrated embodiment, the transport refrigeration system 20 includes sensors 22. The sensors 22 may be utilized to monitor transport parameters 82 internal and external to the container 14. The transport parameters 82 data of the perishable goods 34 being transported by the transport refrigeration system 20, data of the transport refrigeration unit 28, and/or data of the overall transportation refrigeration system 20, as described further below. The transport parameters 82 monitored by the sensors 22 may include but are not limited to temperature, pressure, humidity, carbon dioxide, ethylene, ozone, light exposure, vibrations, and other conditions in the interior compartment 18. Accordingly, suitable sensors 22 are utilized to monitor the desired parameters. Advantageously, sensors 22 may be selected for certain applications depending on the perishable cargo to be monitored and the corresponding environmental sensitivities. In an embodiment, temperatures are monitored. In certain embodiments, a user desires to maintain and monitor temperatures or other parameters within an acceptable range. As seen in FIG. 1, the sensors 22 may be placed directly on the perishable goods 34.

Further, as in the illustrated embodiment, sensors 22 may be used to monitor various transport parameters 82 of the transport refrigeration system 20. These sensors 22 may be placed in a variety of locations including but not limited to on the transport refrigeration unit 28, on a door 36 of the container 14 and throughout the interior compartment 18. The sensors 22 may be placed directly within the transport refrigeration unit 28 to monitor the performance and power usage of the transport refrigeration unit 28. Individual components internal to the transport refrigeration unit 28 may also be monitored by sensors 22 to detect performance aspects, such as, for example usage cycles, duration, temperatures and pressure of individual components. As seen, the sensors 22 may also be placed on the door 36 of the container 14 to monitor the position of the door 36. Whether the door 36 is open or closed affects both the temperature of the container 14 and the performance of the transport refrigeration unit 28. For instance, in hot weather, an open door 36 will allow cooled air to escape from the container 14, causing the temperature of the interior compartment 18 to rise, which creates additional stress on the transport refrigeration unit 28 by forcing the transport refrigeration unit 28 to work harder to cool the interior compartment 18. Additionally, the global positioning system (GPS) location may also be detected by the sensors 22. The GPS location may help in providing information from other data sources 40 regarding local weather 42 (including solar gain) experienced by the container 14 along the travel route. The local weather 42 affects the temperature of the container 14 and thus affects the operation of the transport refrigeration unit 28. For instance, the transport refrigeration unit 28 may have to work harder on a container 14 travelling through a desert that is exposed to long period of heat and solar gain.

As illustrated in FIG. 1, the transport refrigeration system 20 may further include, a controller 30 configured to log a plurality of readings from the sensors 22, known as transport parameters 82, at a selected sampling rate. The controller 30 may be enclosed within the transport refrigeration unit 28 or separate from the transport refrigeration unit 28 as illustrated. The transport parameters 82 may further be augmented with time, position stamps or other relevant information. The controller 30 may also include a processor (not shown) and an associated memory (not shown). The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

In an illustrated embodiment, the transport refrigeration system 20 may include a communication module 32 in operative communication with the controller 30 and in wireless operative communication with a cloud network 60. The communication module 32 is configured to transmit the transport parameters 82 to the cloud network 60 via wireless communication. The wireless communication may be, but is not limited to, radio, microwave, cellular, satellite, or another wireless communication method. The cloud network 60 may be but is not limited to satellite networks, cellular networks, wide area network, or another type of wireless network. The communication module 32 may include a short range interface, wherein the short range interface includes at least one of a wired interface, an optical interface, and a short range wireless interface.

Transport parameters 82 may also be provided by other data sources 40, as illustrated in FIG. 1. The other data sources 40 may include, but are not limited to, weather 42 and manually entered data 48. The weather 42, as discussed above, has an effect on the operation of the transport refrigeration unit 28 by influencing the temperature of the container 14 during transport (e.g. 210 and 214) but the weather 42 also has other influences on the transport refrigeration unit 28. While the system 10 includes sensors 22 to aid in automation, often times the need for manual data entry is unavoidable. The manually entered data 48 may be input via a variety of devices including but not limited to a cellular phone, tablet, laptop, smartwatch, a desktop computer or any other similar data input device known to one of skill in the art.

Data sources 40 may also include: information about the perishable goods 34 being transported that may be received though an electronic interface, or may be manually input. Knowing the perishable goods 34 (e.g., ice cream vs strawberries) could affect the diagnostic information later on since the cold mass can affect the rate at which the return air temperature readings change. Other data sources 40 may include offline data files for legacy refrigeration systems, refrigeration system applications, including third party refrigeration systems and applications (i.e., not owned by the same owner of the diagnostics engine 90).

Other data sources 40 may also include other csv, json formats from non-carrier refrigeration systems and provide diagnostics based on a license granted to the client (i.e., owner/operator of the transportation refrigeration unit 28). Alternatively, the client could provide input parameters (e.g., transport parameters 82) for an available diagnostics (descriptive to prescriptive) based on the license they have and get the insights (e.g., output data 100, see below) in response to the input parameters. For example: a small third party refrigeration provider could procure a license and provide input parameters (e.g., transport parameters 82) to obtain output data 100 discussed below.

In the illustrated embodiment, the system 10 further includes a diagnostics engine 90 and a storage device 80 operably associated with the diagnostics engine 90. The diagnostics engine 90 and the storage device 60 may be located within the cloud network 60. It should be appreciated that, although particular systems are separately defined in the schematic block diagrams, each or any of the systems may be otherwise combined or separated via hardware and/or software. The diagnostics engine 90 is in electronic communication with the storage device 60. The diagnostics engine 90 may be or include a processor including but not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The storage device 80 may be but is not limited to a random access memory (RAM), read only memory (ROM), or other electronic, optical, magnetic or any other computer readable medium.

The storage device 80 is configured to store transport parameters 82 associated with the transport refrigeration unit 28, historical transport parameters 84, maintenance history 86 of the transport refrigeration unit 28, and customer licenses 88. The storage device 80 may be but is not limited to a random access memory (RAM), read only memory (ROM), or other electronic, optical, magnetic or any other computer readable medium.

The diagnostics engine 90 may include a license manager 91, a diagnostic module 94, a predictive module 96, and a prescriptive module 98. The license manager 91 is configured to determine what type of customer license 88 a particular user (e.g., customer, client, etc.) has by checking the customer licenses 88 stored in the storage device 80 and then determine what data 100 may be sent to a user device 110 of that user based upon their customer license 88. For example, a client may have only paid for a customer license 88 to receive descriptive data 102 and thus the customer will only receive descriptive data to their user device 110. The user device 110 may be a computing device such as a desktop computer. The user device 110 may also be a mobile computing device that is typically carried by a person, such as, for example a phone, PDA, smart watch, tablet, laptop, etc. The user device 110 may also be two separate devices that are synced together such as, for example, a cellular phone and a desktop computer synced over an internet connection.

The descriptive module organize the transport parameters and transmit the transport parameters as descriptive data 102 to a user device 110. No or very little analysis may be may be associated with the descriptive data 102. For example, the descriptive data 102 may include power usage of the transportation refrigeration system 20.

The diagnostic module 94 determines diagnostics data 104 of the transport refrigeration unit 28 in response to the transport parameters 82. The diagnostic module 94 may determine diagnostic data 104 including faults in the transport refrigeration unit 28 and a potential sources for the fault. The diagnostic module 94 is configured to transmit diagnostic data 104 to user devices 110. The diagnostic module 94 may compare the transport parameters 82 to various thresholds, limits, and ranges, to detect the diagnostic data 104 and then access historical transport parameters 84 to derive one or more potential sources for the fault. For example, the diagnostic data 104 may include power usage of the transportation refrigeration system 20 and diagnosis what is causing the power usage and power efficiency of each component in the transportation refrigeration system 20.

The predictive module 96 determines predictive data 106 in response to the transport parameters 82. The predictive data 106 predict future potential faults and a remaining life of at least one component of the transport refrigeration unit 28. The predictive module 96 is configured to transmit predictive data 106 to user devices 110. The predictive module 96 may detect patterns in the transport parameters (e.g., patterns of high/low compressor outlet pressure) to predict a failure. The predictive module 96 may use a baseline life curve which provides remaining life as a function of time. The baseline life curve may be generated based on the historical transport parameters 84. The baseline life curve may be adjusted or shifted in response to events or transport parameters 82. For example, detection of operation under harsh high ambient conditions may reduce the remaining life whereas the occurrence of a maintenance operation may extend the remaining life. In another example, the predictive data 106 may include a predicted power usage of each component of the transportation refrigeration system 20 and also predict the power efficiency of each component of the transportation refrigeration 20.

The prescriptive module 108 determines prescriptive data 108 in response to the transport parameters 82. The predictive module 96 is configured to transmit prescriptive data 108 to user devices 110. The prescriptive data 108 may include a recommendation for upcoming maintenance of the transport refrigeration unit 28. The prescriptive module 108 may detect trends in the transport parameters 82, compare the transport parameters 82 to thresholds and/or determine rates of change of in transport parameters 82 to determine a need for preventative maintenance. The existence of a series of alarm occurrences (e.g., over-pressure) may indicate the need for preventative maintenance. In an example, the prescriptive data 108 may include a recommendation on how to change power usage and/or power efficiency of each component of the transportation refrigeration system 20.

The diagnostic module 94, predictive module 96, and prescriptive module 98 may utilize historical transport parameters 84 from other transport refrigeration units and the maintenance history 86 of the current transport refrigeration unit 28 in their determinations. The historical transport parameters 84 may provide information such as, for example, life curves, failure rates, and a selected range of conditions for each component of the transport refrigeration unit 28. The selected range of conditions may define the normal operating conditions of component of the transport refrigeration unit 28. Operation outside of the selected range of conditions may indicate an issue with a component of the transport refrigeration unit 28. The maintenance history 86 may help indicate persistent issues with a component of the transport refrigeration unit 28. The maintenance history 86 may also help the predictive module 96 adjust the maintenance schedule of the transport refrigeration unit 28.

Advantageously, as provided herein, the diagnostics engine 90 may provide data 100 at various levels to help to better predict maintenance schedules and reduce unplanned down time of the transport refrigeration system 20.

Referring now to FIG. 2 with continued reference to FIG. 1. FIG. 2 shows a flow diagram illustrating a method 200 for analyzing a transport refrigeration system 20, according to an embodiment of the present disclosure. At block 204, transport parameters 82 associated with a transport refrigeration system and customer licenses 88 are stored on a storage device 80. A block 206, it is determined whether a user device 110 has a customer license 88 for at least one of descriptive data 102, diagnostic data 104, predictive data 106, and prescriptive data 106. At block 208, at least one of descriptive data 102, diagnostic data 104, predictive data 106, and prescriptive data 108 is determined in response to at least the transport parameters 82.

At block 210, different data 100 is transmitted to the user device 110 (e.g., or the user device is granted access to it via an internet connection) depending upon the customer license 88 associated with the user device 110. At block 210a, descriptive data 102 is transmitted to the user device 110 if the user device 110 has a customer license 88 for descriptive data 102. At block 210b, diagnostic data 104 is transmitted to the user device 110 if the user device 110 has a customer license 88 for diagnostic data 104. At block 210c, predictive data 106 is transmitted to the user device 110 if the user device 110 has a customer license 88 for predictive data 106. At block 210d, prescriptive data 108 is transmitted to the user device 110 if the user device 110 has a customer license 88 for prescriptive data 88.

The method 200 may further comprise storing historical transport parameters 84 for the transport refrigeration system 20 and/or storing a maintenance history 86 of the transportation refrigeration system 20. The descriptive data 102 may be determined in response to the at least one of the transport parameters 82, the historical transport parameters 84, and the maintenance history 86. The diagnostic data 104 may be determined in response to the at least one of the transport parameters 82, the historical transport parameters 84, and the maintenance history 86. The predictive data 106 may be determined in response to the at least one of the transport parameters 82, the historical transport parameters 84, and the maintenance history 86. The prescriptive data 108 may be determined in response to the at least one of the transport parameters 82, the historical transport parameters 84, and the maintenance history 86.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for analyzing a transport refrigeration system, the system comprising:
    a storage device to store transport parameters associated with a transport refrigeration system and customer licenses;
    a diagnostics engine in electronic communication with the storage device, the diagnostics engine including:
    a license module to determine whether a user device has a customer license for at least one of descriptive data, diagnostic data, predictive data, and prescriptive data;
    a descriptive module to determine descriptive data in response to at least the transport parameters and transmit the descriptive data to the user device if the user device has a customer license for descriptive data;
    a diagnostic module to determine diagnostic data of the transport refrigeration unit in response to at least the transport parameters and transmit the diagnostic data to the user device if the user device has a customer license for diagnostic data;
    a predictive module to determine predictive data in response to at least the transport parameters and transmit the predictive data to the user device if the user device has a customer license for predictive data; and
    a prescriptive module to determine prescriptive data in response to at least the transport parameters and transmit the prescriptive data to the user device if the user device has a customer license for prescriptive data.

2. The system of claim 1, wherein:
    the storage device stores historical transport parameters for the transport refrigeration system.

3. The system of claim 2, wherein:
    the descriptive module determines descriptive data in response to the transport parameters and historical transport parameters.

4. The system of claim 2, wherein:
    the diagnostic module determines diagnostic data in response to the transport parameters and historical transport parameters.

5. The system of claim 2, wherein:
    the predictive module determines predictive data in response to the transport parameters and historical transport parameters.

6. The system of claim 2, wherein:
    the prescriptive module determines prescriptive data in response to the transport parameters and historical transport parameters.

7. The system of claim 1, wherein:
    the storage device stores a maintenance history of the transportation refrigeration system.

8. The system of claim 7, wherein:
    the descriptive module determines descriptive data in response to the transport parameters and the maintenance history.

9. The system of claim 7, wherein:
    the diagnostic module determines diagnostic data in response to the transport parameters and the maintenance history.

10. The system of claim 7, wherein:
    the predictive module determines predictive data in response to the transport parameters and the maintenance history.

11. The system of claim 7, wherein:
    the prescriptive module determines prescriptive data in response to the transport parameters and the maintenance history.

12. A method for analyzing a transport refrigeration system, the method comprising:
    storing transport parameters associated with a transport refrigeration system and customer licenses;

determining whether a user device has a customer license for at least one of descriptive data, diagnostic data, predictive data, and prescriptive data;

determining at least one of descriptive data, diagnostic data, predictive data, and prescriptive data in response to at least the transport parameters;

transmitting the descriptive data to the user device if the user device has a customer license for descriptive data;

transmitting the diagnostic data to the user device if the user device has a customer license for diagnostic data;

transmitting the predictive data to the user device if the user device has a customer license for predictive data; and transmitting the prescriptive data to the user device if the user device has a customer license for prescriptive data.

13. The method of claim 12, further comprising:
storing historical transport parameters for the transport refrigeration system.

14. The method of claim 13, wherein:
the descriptive data is determined in response to the transport parameters and historical transport parameters.

15. The method of claim 13, wherein:
the diagnostic data is determined in response to the transport parameters and historical transport parameters.

16. The method of claim 13, wherein:
the predictive data is determined in response to the transport parameters and historical transport parameters.

17. The method of claim 13, wherein:
the prescriptive data is determined in response to the transport parameters and historical transport parameters.

18. The method of claim 12, further comprising:
storing a maintenance history of the transportation refrigeration system.

19. The method of claim 18, wherein:
the descriptive data is determined in response to the transport parameters and the maintenance history.

20. The method of claim 18, wherein:
the diagnostic data is determined in response to the transport parameters and the maintenance history.

* * * * *